Oct. 14, 1952  D. B. MONTGOMERY ET AL  2,613,396
METHOD FOR FLAKING FUSED CRYSTALLINE SOLIDS
Filed June 12, 1947  2 SHEETS—SHEET 1

INVENTOR
Duncan Bain Montgomery
Edward V. Hegg
by Popp and Popp
ATTORNEYS

Oct. 14, 1952 D. B. MONTGOMERY ET AL 2,613,396
METHOD FOR FLAKING FUSED CRYSTALLINE SOLIDS
Filed June 12, 1947 2 SHEETS—SHEET 2

INVENTOR
Duncan Bain Montgomery
Edward V. Hegg
by Popp and Popp
ATTORNEYS

Patented Oct. 14, 1952

2,613,396

UNITED STATES PATENT OFFICE 2,613,396

METHOD FOR FLAKING FUSED CRYSTALLINE SOLIDS

Duncan Bain Montgomery, Gardenville, and Edward V. Hegg, Eggertsville, N. Y., assignors to Blaw-Knox Company, Pittsburgh, Pa., a corporation of New Jersey Application June 12, 1947, Serial No. 754,304

2 Claims. (Cl. 18—47.5)

Our invention relates to a method for flaking fused crystalline solids and more particularly to flaking fused crystalline materials which on cooling from the molten state readily form undercooled or supercooled liquids which are apt to solidify or crystallize very slowly, or not at all, if they are cooled too far below the solidifying point on the surface of a revolving drum. Examples of such materials are dichloro-diphenyl-trichlorethane, more exactly designated as 2,2-bis - (parachlorophenyl) - 1,1,1 - trichloroethane; 2,2 - bis - (4 - methoxyphenyl) - 1,1,1 - trichloroethane, hereinafter referred to as methoxychlor which is a generic designation used in the trade for this and similar compounds; and hexa-chloro-cyclo-hexane which commercially is a mixture of several isomers.

One of the principal objects of our invention is to provide a method for flaking, on a revolving drum, fused crystalline solids by which the crystallization is accelerated to a very pronounced degree; and our invention is thereby particularly applicable to flaking those fused crystalline solids which on cooling from the molten state readily form undercooled liquids which are apt to solidify very slowly, or not at all, if they are cooled too far below their melting point.

Another object of our invention is to provide such a method in which the flaked product is of uniformly high quality, particularly with such fused crystalline solids which readily form undercooled liquids and are difficult to solidify.

Another object is to provide such a method which is rapid and continuous in operation and of high capacity particularly in flaking such fused crystalline solids which readily form undercooled liquids and are difficult to solidify.

Another object is to provide such a method which permits the use of a lower temperature cooling medium.

Another object is to provide such a method in which the necessity for close control and supervision is reduced, particularly in flaking such fused crystalline solids which readily form undercooled liquids and are difficult to solidify.

Another aim is to provide such an apparatus and process which permit accurate control of the conditions under which the material is flaked.

Another object is to provide such apparatus which is simple and inexpensive in construction and is not likely to foul up or present other service difficulties.

Another object is to provide such a process in which the fused solid is converted into thin flakes, scales, chips or laminae of substantially uniform thickness and with a preponderance of th flakes in curled form, such flakes being capable of being handled by hand safely and expeditiously and being capable of being readily reduced to powder or put in solution in the solvents generally used for this purpose.

Another object is to produce the flaked material in a sensibly dry, non-greasy, free-flowing form in which it does not coalesce or cake in storage.

Another object is to provide such a process in which the flaked material can be produced at lower cost.

Other objects and advantages of the invention will appear from the following description and drawings in which.

Figure 1:
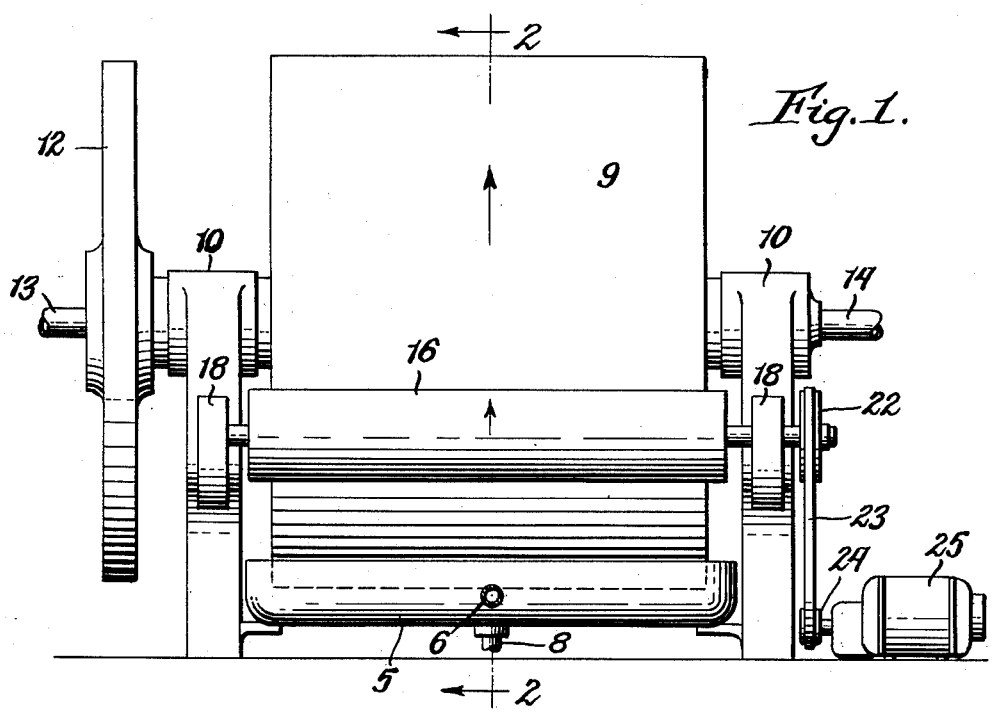
Fig. 1 is a rear elevational view of a revolving drum flaker constructed in accordance with the present invention.

While our invention is applicable to the flaking of a number of fused crystalline materials which readily form undercooled or supercooled liquids and which are apt to solidify very slowly, or not at all, if they are cooled too far below their solidifying point on a revolving drum, the invention will be more particularly described in connection with flaking dichloro-diphenyl-trichlorethane, commonly called DDT.

By employing our apparatus and method flakes of dichloro-diphenyl-trichlorethane are produced in a continuous manner from the material in molten form by rotating an internally cooled cylindrical drum so that it dips into the molten dichloro-diphenyl-trichlorethane to a sufficient extent to form a thin film or coating thereon, and by scraping the chilled solidified layer from the rotating drum. A feature of our method resides in forming a thin film or coating on the drum and in maintaining the temperature of the cooling medium supplied to the drum within comparatively close limits, the maintenance of the drum temperature within these limits being essential to the production of dichloro-diphenyl-trichlorethane in the form of thin, sensibly dry, non-greasy, free-flowing flakes, scales or laminae.

A further important feature of our method resides in accelerating the crystallization of the film of material on the flaking drum by a rapid working of the outer surface of the film when it reaches the temperature at which crystallization can start. This temperature is close to the solidifying or melting point of the material being flaked; and our apparatus includes a tool to work the surface of the film, which tool is arranged approximately at that place along the flaking drum periphery at which the film of material reaches its solidifying or melting point. This film working tool preferably extends the full length of the flaking drum and is spaced from the drum a distance substantially equal to the thickness of the film and is rapidly moved to effect the necessary working of the surface of the film.

In carrying out our invention, the molten dichloro-diphenyl-trichlorethane, or other fused crystalline solid which readily forms into an undercooled liquid and is difficult to solidify, is fed to a jacketed pan or receptacle 5, the jacket of which is shown as supplied with a heating medium by means of a pipe 6, the temperature of the heating medium being such as to furnish sufficient heat to keep the material in a liquid condition, dichloro-diphenyl-trichlorethane having a melting point of between 194–196° F. Any excess feed of the material can be relieved by the overflow 8. This overflow can be adjusted in order to regulate the depth to which the flaking drum dips into the liquid.

This cylindrical flaking drum 9 is rotatably mounted in trunnion stands 10 so that the lower part of its periphery dips into the bath or body 11 of the molten material maintained in the pan 5. This flaking drum is rotated in the direction of the arrow shown in Fig. 2 in any suitable manner, as by a large internal ring gear 12 attached to one stub axle of the drum. This drum is cooled in any suitable manner as by means of water supplied through an inlet 13 extending through one stub axle of the drum, and an outlet 14 extending through the stub axle on the opposite end of the drum. As the drum revolves it picks up a thin film of liquid dichloro-diphenyl-trichlorethane and as this film travels around on the cooled surface of the drum it hardens and is finally scraped off by a knife or doctor blade 15 in the form of small flakes which can be collected in any suitable manner. The speed at which the drum revolves is regulated to provide sufficient time for the thin film of liquid to cool, crystallize and become sufficiently solid to be removed by the knife in the form of flakes, chips, scales or laminae. As hereinafter described in detail, this crystallization and solidifying of the film is materially accelerated by working the surface of the film when it reaches a temperature corresponding to its solidifying or melting point, this working of the material increasing the speed at which the flaking drum can be revolved and hence increasing the capacity of the apparatus.

To produce dichloro-diphenyl-trichlorethane in a flaked condition and not greasy or soft, it is preferred to maintain the temperature of the water or other cooling medium in the flaking drum within the range of from 120–135° F. The level of the molden dichloro-diphenyl-trichlorethane in the feed pan 5 should also be controlled within close limits in order to avoid a greasy or soft condition of the flakes leaving the drum. The best results are obtained when the drum dips into the molten dichloro-diphenyl-trichlorethane just sufficiently to take on a coating. This condition is particularly important in obtaining uniformity in the product.

We have found that increased capacity and greater uniformity in the product can be obtained by agitating or working the exterior surface of the film of material on the flaking drum after it has been cooled to its melting or solidification point and preferably at or close to that particular location on the flaking drum where the film reaches this solidification or melting point. Preferably a tool is used for so working the surface of the film on the flaking drum 9 and this tool can be either rotated or reciprocated.

Figure 2:
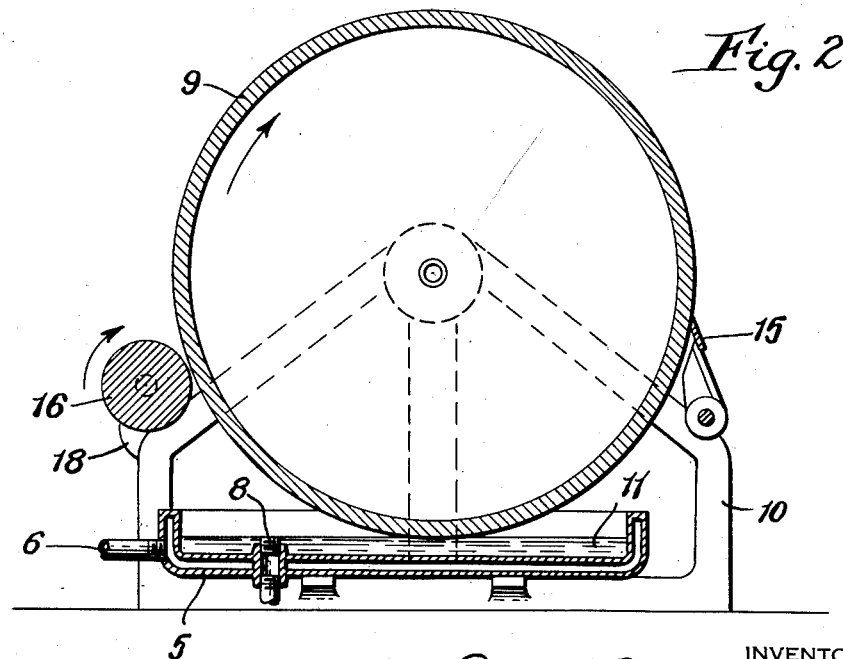
Fig. 2 is a vertical transverse sectional view taken on line 2—2, Fig. 1.

In the form of our apparatus shown in Figs. 1 and 2, the flaker is equipped with a rapidly rotated roller 16 for this purpose. This roller is shown as being journalled in suitable supports 18, carried by the trunnion stands 11 of the flaker and is preferably adjustable with respect to the drum. The roller is preferably spaced from the drum a distance approximately equal to the thickness of the film of material adhering to the drum so that the roller 16 barely contacts the surface of the film.

The location of the roller 16 along the periphery of the flaking drum is important. In the apparatus as shown in Figs. 1 and 2 the roller is arranged on the rear or opposite side of the flaking drum from the knife or doctor blade 15 at a substantial distance above the pan 5. This location of the roller is determined by the temperature of the film on the flaking drum at this particular point, it being important that the roller work the surface of the film after the film has been cooled to approximately its melting or solidification point and preferably close to that location on the drum at which the film reaches its melting or solidification point. No advantage is obtained if the roller 16 is located close to the knife or doctor blade 15 and no advantage is obtained if the roller is located on the opposite side of the flaking drum but so close to the pan 5 that the temperature of the film of liquid on the drum has not yet dropped substantially to the melting or solidification point of the material being processed.

The roller 16 is rotated at a high rate of speed relative to the drum 9 and in the same direction, that is, both clockwise as indicated by the arrows in Fig. 2, so that the opposing surfaces of the drum and roller travel in opposite directions. The roller 16 can be rotated by any suitable means, as by a pulley 22 fast to its shaft and connected by a belt 23 with a pulley 24 driven by an electric motor 25.

In the operation of the flaker with the roller 16 in flaking, for example, dichloro-diphenyl-trichlorethane, the film of the molten dichloro-diphenyl-trichlorethane picked up by the periphery of the flaking drum contacting the surface of the body 11 of dichloro-diphenyl-trichlorethane in the pan 5, is cooled to approximately its melting or solidification point in traveling along the rising undesurface of the flaking drum and then is brought into contact with the roller 16, the contacting surface of which is traveling in the opposite direction from the film at a relatively high rate of speed. This contact with the roller works, agitates, massages or shocks the partially cooled film on the drum so as to initiate and materially accelerate crystalization thereof and retard the undercooling or supercooling thereof. Since the rate of crystallization determines the speed of the flaking drum of any given diameter, which speed must be adjusted so that crystallization is sufficiently complete at the doctor blade 15 to provide the desired product, it will be seen that the acceleration of crystallization by the roller 16 increases the capacity of the flaker by permitting an increase in the speed of rotation of the flaking drum 9.

As the operation proceeds, a coating or film of crystallized material builds up on the roller 16. A part of this coating of solid material on the roller 16 is deposited by the roller upon the surface of the flaking drum 9 in the form of parallel ridges extending axially of the drum. These ridges do not extend the full length of the flaking drum but occur in more or less regular patches, both the ridges and the patches spreading during the travel of the film on the flaking drum from the roller 16 to the doctor blade or knife 15. Better results are obtained with a more uniform pattern of ridges of solid material so deposited on the flaking drum by the roller and to this end it has been found desirable to maintain a very thin coating of solid material on the roller 16 and a quite close clearance between this coating on the roll and the flaking drum surface. The areas between the ridges of solid material so deposited upon the flaking drum show a rather faint, wavy condition indicating that crystallization spreads between the ridges below the surface of the liquid film and in contact with the surface of the flaking drum. This spread of crystallization in contact with the surface of the flaking drum leaves a liquid surface film on top of the crystallizing material, particularly between the ridges, which sometimes remains liquid until the knife 15 is reached. This liquid surface film is definitely colder to the touch than the flaked product and if any of this liquid surface film is separately removed from the flaking drum it remains liquid for a long time and does not crystallize until agitated or rubbed. This behavior is very unusual because undercooled liquids generally crystallize rather rapidly once crystallization has started at a number of points, the crystallization spreading quite rapidly from these focal points. However, in spite of the fact that a liquid surface condition sometimes exists between the ridges contacting the knife, the material solidifies rapidly on removal from the flaking drum by the knife. This clearly indicates that the action of the knife is an important factor in causing the liquid to solidify. This action of the knife consists in gathering the material on removal from the flaking drum, with consequent agitation, working, massaging or shock, and also in bringing the relatively warm solid particles in close contact with the cold liquid. It therefore appears that the liquid film on the flaking drum must be disturbed to cause it to solidify and that the solidification occurs chiefly at two points, namely, at the roller 16 and at the knife 15.

The thickness of the film of solidified material on the roller 16 is self-regulating and as the operation proceeds some of the crystalline material on the roller moves along to the opposite ends of the roller where it builds up in the form of rings around the roller ends and when an excess of crystalline material so builds up in the form of rings at the opposite ends of the roller, this excess material drops back into the heated pan 5 and is remelted therein. There is no apparent accumulation of the crystallized material on the roller except in the formation of these rings. This coating building up upon the roller 16 reduces the effective spacing between the drum 9 and the roller 16 to less than the thickness of the film of molten material picked up by the drum 9 and this effective spacing stabilizes itself within a very short time to provide the desired close clearance between this coating and the flaking drum in obtaining a more uniform pattern of the ridges of solid material deposited by the roller on the flaking drum.

Contact of the roller 16 with the surface of the film of material on the drum 9 is, of course, necessary to establish this crystalline coating upon the roller 16 but if, as the crystalline coating on the roller 16 builds up, the roller is adjusted away from the drum so as to increase the effective clearance between it and the drum 9, the crystalline coating on the roller 16 again builds up to provide the desired self-regulating effective spacing between the roller and the drum. However, no advantage is obtained from such adjustment. If too thick a crystalline coating builds up on the roller 16, large patches of this crystalline coating are taken off from the roller by the drum. This leaves bare patches on the roller 16 which are not in contact with the film on the drum and hence the crystallization of these patches is not accelerated, the material from these patches being removed by the doctor blade 15 as an undercooled or supercooled liquid which may never crystallize and may cause caking if it does. Accordingly, it is desirable to leave the roller 16 in its original adjustment, that is, in the position in which it initially barely contacts the surface of the film of the material on the drum 9, the effective spacing of this roller from the flaking drum being self-regulated by the crystalline coating built up thereon.

The building up of this crystalline coating has the further result, however, of effecting a transfer of some of the liquid material from the drum to the roller and back to the drum, a double shear of the material being effected by this transfer, and the material not transferred being also subjected to pressure, vibration and agitation. Thus, as the coating builds up on the roller 16, the material entering the crevice between the roller and drum is subjected to pressure, the back pressure of this material forcing some of the crystallized material axially along the roller and hence determining the self-maintaining effective clearance between the roller and the drum. The entire film on the drum, being thicker than this clearance, cannot pass therethrough and any excess is taken off in liquid condition by the undersurface of the roller and carried around in contact with the solid coating to its upper side where it is partly reunited with or redeposited on the film on the flaker drum in partly crystallized condition, the balance moving to the ends of the roller as above described. In such transfer from and to the flaker drum, the film of liquid material being flaked, at or close to its solidification point, is subjected to a double shear, to vibration and to agitation and to contact with the coating of crystallized material.

The speed of rotation of the flaking drum 9 and roller 16 varies with the particular material being flaked. For a given material the angular speeds of the flaking drum and roller is determined by the diameters of the flaking drum and roller so as to produce the necessary relative movement between the opposing surfaces of the flaking drum and roller as well as to allow sufficient time to effect crystallization of the material to the desired degree before removal from the flaking drum. In the following examples of the practice of the invention, the flaker employed had a flaking drum diameter of 6 inches and the roller had a diameter of 1 inch.

The following table shows the results in using the above flaker in a flaking dichloro-diphenyl-trichlorethane with and without the use of the roller 16 and from which it will be noted that the capacity is increased from 1.96 lbs. to 4.58 lbs. per hour per square foot of flaker drum surface, or more than doubled, by the use of the roller 16 in accordance with the present invention. In both cases the product was in the form of non-greasy flakes and of commercially satisfactory form.

|  | Without Roller | With Roller |
|---|---|---|
| Material Fed, Temperature °F | 206 | 208 |
| Cooling Water, Entering Temperature °F | 130 | 129 |
| Cooling Water, Leaving Temperature °F | 130 | 129 |
| Roller Speed, R. P. M | | 360 |
| Peripheral Speed of Roller relative to Drum in./min | | 1,148 |
| Speed of Drum, R. P. M | ⅞ | 1¾ |
| Material Leaving Drum, Temperature °F | 120 | 120 |
| Thickness of flake inches | 0.015 | 0.012–0.014 |
| Average Capacity Material Produced per hour per square foot lbs | 1.96 | 4.58 |

The following table illustrates that with different products, using the same flaker, a lower peripheral speed of the roller relative to the drum can be employed, the material flaked being methoxychlor as heretofore defined and having a melting range of from 172–180° F. and having the same characteristics as dichloro-diphenyl-trichlorethane in that it readily forms a supercooled liquid that crystallizes slowly, if at all. In both cases the product was in a commercially satisfactory flaked form.

|  | Lower Roller Speed | Higher Roller Speed |
|---|---|---|
| Material Fed, Temperature °F | 200 | 200 |
| Cooling Water, Entering Temperature °F | 120 | 120 |
| Cooling Water, Leaving Temperature °F | 120 | 120 |
| Roller Speed, R. P. M | 160 | 360 |
| Peripheral Speed of Roller Relative to Drum in./min | 524 | 1,162 |
| Speed of Drum, R. P. M | 1¼ | 1⅝ |
| Material Leaving Drum, Temperature °F | 100 | 110 |
| Average Capacity Material, per hour per square foot lbs | 4.11 | 5.79 |

Figure 3:
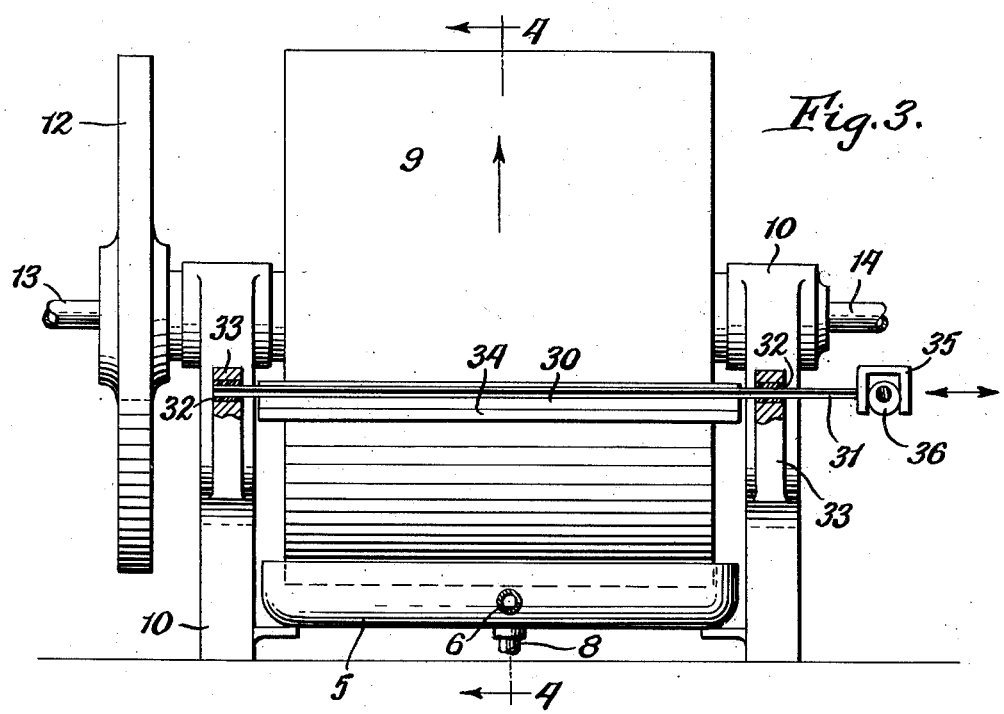
Fig. 3 is a view similar to Fig. 1 and showing a modified form of the invention.
Figure 4:
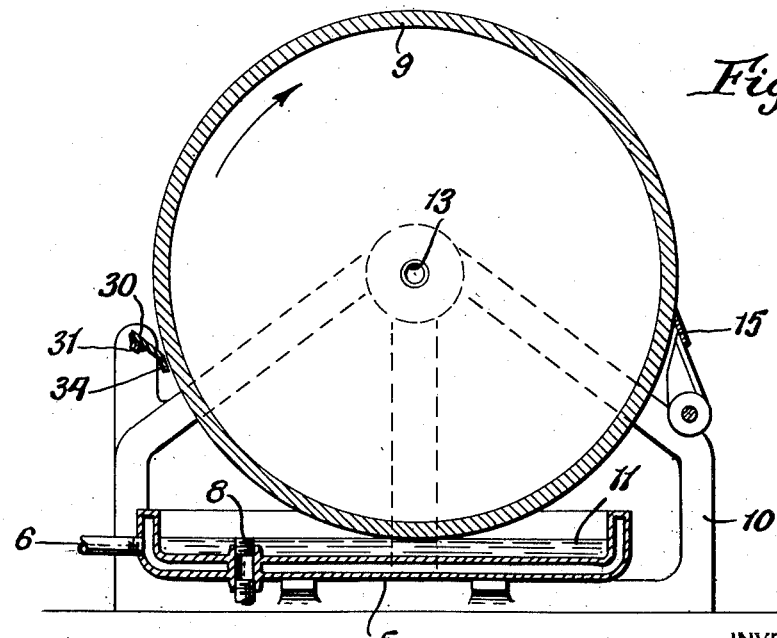
Fig. 4 is a vertical transverse sectional view taken on line 4—4, Fig. 3.

The tool for working or massaging the film of material on the flaking drum 9 is not necessarily in the form of the roller 16 but can be in the form of a reciprocating bar or screed, as illustrated in Figs. 3 and 4. In this modified form of the invention, the flaking drum, doctor blade and feed pan are of the same form as in the form of the invention shown in Figs. 1 and 2 and hence the same reference numerals have been employed. Instead, however, of the roller 16 and its mounting and drive, the film working tool is in the form of a sheet metal plate which extends the full length of the drum and is fast to a slide rod 31 extending longitudinally and projecting beyond the ends of the plate 30. The opposite ends of the slide rod 31 are mounted in slideways 32 which can be formed in standards 33 carried by the end heads or trunnion stands 10 of the flaker and which can be formed to hold the slide rod against turning. This slide rod 31 is shown as supported on the opposite side of the flaking drum from the knife or doctor blade 15 and as arranged generally in horizontal alinement with the axis of the flaking drum. The plate 30 is shown as extending downwardly from the slide rod 31 toward the periphery of the flaking drum and as having a depending flange, lip or shoe 34 which conforms to the drum and is arranged at the same location as the roller 16 in the form of the invention shown in Figs. 1 and 2 and in closely spaced relation to the periphery of the flaking drum 9. The slide rod 31, together with the plate 30 are reciprocated lengthwise of the slideways 32 and for this purpose one end of the slide rod 31 is shown as fast to a cam follower or yoke 35, the opposite vertical sides of which embrace an eccentric 36 which can be mounted and driven in any suitable manner (not shown), the eccentric being driven in the following example to provide about 200 strokes per minute, the stroke being about ½ inch.

The following table shows the results in using the above flaker in flaking, with and without the use of the roller 16, hexa-chlorocyclo-hexane which commercially is a mixture of several isomers. From this table it will be noted that the use of the roller 16 made it possible to reduce the temperature of the cooling water from 130° F. to 80° F. and also more than doubled the capacity of the flaker. In both cases the product was in a commercially satisfactory flaked form.

|  | Without Roller | With Roller |
|---|---|---|
| Material Fed, Temperature °F | 262 | 264 |
| Cooling Water, Entering Temperature °F | 130 | 80 |
| Cooling Water, Leaving Temperature °F | 131 | 80 |
| Roller Speed, R. P. M | | 360 |
| Peripheral Speed of Roller Relative to Drum in./min | | 1,282 |
| Speed of Drum, R. P. M | 5⅔ | 8 |
| Material Leaving Drum, Temperature °F | 144 | 106 |
| Average Capacity Material, per hour per square foot lbs | 35.6 | 74.9 |

The following table shows the results in using the above flaker in flaking a solid insecticide material containing 20% to 25% water and which solidifies at about 122° F., this material having the same characteristics as dichloro-diphenyl-trichlorethane in that it readily forms a supercooled liquid that crystallizes slowly, if at all. The product was in commercially satisfactory flaked form. The doctor blade 15 was adjusted to leave a thin coating on the drum in order to speed the film picked up by the drum from the pan 5. The flange or shoe 34 was adjusted to barely contact the film of liquid carried by the drum 9. While a slight pad or coating of crystallized material built up on the flange or shoe 34, this coating did not grow to the extent of interfering with its proper operation.

| | |
|---|---|
| Material fed, temperature °F | 140–145 |
| Cooling water, entering temperature °F | 74 |
| Cooling water, leaving temperature °F | 75 |
| Speed of drum, R. P. M | 1 |
| Reciprocating plate, strokes per minute | 200 |
| Length of stroke of reciprocating plate inch | ½ |
| Average capacity material per hour per square foot lbs | 1.26 |

From the foregoing it will be seen that the present invention provides a method and apparatus for successfully and rapidly flaking fused crystalline solids, particularly dichloro-diphenyl-trichlorethane and methoxychlor, which on cooling from the molten state readily form undercooled or supercooled liquids which solidify or crystallize very slowly, or not at all. It will fur-

We claim:

1. The method of producing flakes of a material characterized by readily forming a supercooled liquid upon cooling from the molten state and solidifying very slowly if cooled too far below the solidification point, which comprises forming the material in a molten state into a broad thin film of uniform thickness throughout its width, moving said film through a cooling zone whereby said film is progressively cool, continuously stressing said film by dividing the same across its full width into two parts at that place along said film where the material has been cooled to approximately its solidification point, continuously spacially separating one of said parts from the other, continuously stressing said parts by reuniting the same at differential velocities, the stressing occasioned by said dividing and reuniting of said parts of said film initiating the solidification thereof, moving said reunited parts through a cooling zone to continue such solidification, and thereafter breaking up the reunited parts into flakes.

2. The method of producing flakes of a material characterized by readily forming a supercooled liquid upon cooling from the molten state and solidifying very slowly if cooled too far below the solidification point, which comprises forming the material in a molten state into a broad thin film of uniform thickness throughout its width, moving said film through a cooling zone whereby said film is progressively cooled, contacting the full width of said film at that place along said film where the material has been cooled to approximately its solidification points with a roller, continuously rotating said roller so that its surface travels in a direction opposite to the surface of said moving film whereby said roller continuously divides said film across the full width thereof into two parts, spacially separates one of said parts from the other, and reunites the parts by forcing said parts into contact with each other and while said parts are traveling in opposite directions, the stressing of the material occasioned by said dividing and reuniting of said parts of said film initiating the solidification thereof, moving said reunited parts through a cooling zone to continue such solidification, and thereafter breaking up the reunited parts into flakes.

DUNCAN BAIN MONTGOMERY.
EDWARD V. HEGG.

REFERENCES CITED

The following references are of record in the file of this patent:

UNITED STATES PATENTS

| Number | Name | Date |
|---|---|---|
| 475,748 | Bellamy | May 31, 1892 |
| 1,594,390 | Van Stone | Aug. 3, 1926 |
| 1,883,112 | Tiers | Oct. 18, 1932 |
| 2,118,438 | Lawrence | May 24, 1938 |
| 2,555,309 | Beam | June 5, 1951 |

FOREIGN PATENTS

| Number | Country | Date |
|---|---|---|
| 455,683 | Germany | Feb. 6, 1928 |